US012570781B2

(12) United States Patent
Lepo et al.

(10) Patent No.: US 12,570,781 B2
(45) Date of Patent: Mar. 10, 2026

(54) POLYMER DISPERSION, ITS USE AND PROCESS FOR ITS PREPARATION

(71) Applicant: KEMIRA OYJ, Helsinki (FI)

(72) Inventors: Anneli Lepo, Espoo (FI); Elsi Turunen, Espoo (FI); Tarja Turkki, Espoo (FI); Katriina Kalliomäki, Espoo (FI)

(73) Assignee: KEMIRA OYJ, Helsinki (FI)

( * ) Notice: Subject to any disclaimer, the term of this patent is extended or adjusted under 35 U.S.C. 154(b) by 823 days.

(21) Appl. No.: 17/789,942

(22) PCT Filed: Dec. 30, 2020

(86) PCT No.: PCT/FI2020/050877
§ 371 (c)(1),
(2) Date: Jun. 29, 2022

(87) PCT Pub. No.: WO2021/136884
PCT Pub. Date: Jul. 8, 2021

(65) Prior Publication Data
US 2023/0074142 A1 Mar. 9, 2023

(30) Foreign Application Priority Data
Dec. 30, 2019 (FI) ...................................... 20196136

(51) Int. Cl.
| | |
|---|---|
| *C08F 220/18* | (2006.01) |
| *C08F 2/00* | (2006.01) |
| *C08F 2/10* | (2006.01) |
| *C08F 212/08* | (2006.01) |
| *C08F 220/60* | (2006.01) |

(52) U.S. Cl.
CPC ............ *C08F 220/18* (2013.01); *C08F 2/001* (2013.01); *C08F 2/10* (2013.01); *C08F 212/08* (2013.01); *C08F 220/60* (2013.01)

(58) Field of Classification Search
CPC .... C08F 220/18; C08F 212/08; C08F 220/60; C08F 2/00; C08F 2/10
USPC ........................................................ 524/460
See application file for complete search history.

(56) References Cited

U.S. PATENT DOCUMENTS

| | | | |
|---|---|---|---|
| 7,579,414 B2 | 8/2009 | Kukula et al. | |
| 8,901,227 B2 | 12/2014 | Song et al. | |

| | | | |
|---|---|---|---|
| 2002/0040088 A1 | 4/2002 | Hauschel et al. | |
| 2009/0068485 A1 | 3/2009 | Inaoka | |
| 2010/0022701 A1 | 1/2010 | Brockmeyer et al. | |
| 2011/0048660 A1 | 3/2011 | Esser et al. | |

FOREIGN PATENT DOCUMENTS

| | | | | |
|---|---|---|---|---|
| JP | 2009242686 A | 10/2009 | | |
| WO | 2000044983 A1 | 8/2000 | | |
| WO | 20120069460 A1 | 5/2012 | | |
| WO | 2017093368 A1 | 6/2017 | | |
| WO | 201700115012 A1 | 7/2017 | | |
| WO | WO-2017115012 A1 * | 7/2017 | .......... | C09D 133/06 |
| WO | 201800001885 A1 | 1/2018 | | |
| WO | WO-2018001885 A1 * | 1/2018 | ................ | C08F 2/28 |
| WO | 2018178255 A1 | 10/2018 | | |

OTHER PUBLICATIONS

Office Action issued on Sep. 17, 2024, in Japanese Patent Application No. 2022-539757.
English translation of Search Report regarding corresponding application CN2020800907421, issued on Oct. 12, 2023; 3p.
International Search Report and Written Opinion, in connection with International Application No. PCT/FI2020/050877, dated Apr. 1, 2021.
Japanese Patent Office. Office action and English translation thereof issued in Japanese Application No. 2022-539757 on Mar. 4, 2025. 6 pages.

* cited by examiner

*Primary Examiner* — Deve V Hall
(74) *Attorney, Agent, or Firm* — Meunier Carlin & Curfman LLC

(57) ABSTRACT

The invention relates to an aqueous polymer dispersion and its preparation. The dispersion comprises a styrene acrylate polymer, which is obtainable by free-radical polymerisation of 1-90 weight-% of monomer (a), which comprises at least one optionally substituted styrene; 10-99 weight-% of monomer (b), which comprises at least one alkyl (meth) acrylate, and 0-9 weight-% of monomer (c), which comprises at least one ethylenically unsaturated monomer, which is different from monomer (b). The polymerisation is conducted in a polymerisation medium comprising a cationic prepolymer, which is obtainable by free radical polymerisation of at least 10-55 weight-% of a monomer (i), which comprises at least one ethylenically unsaturated quaternary and/or tertiary amine, 35-90 weight-% of a monomer (ii), which comprises at least one optionally substituted styrene, and 0-55 weight-% of a monomer (iii), which comprises at least one alkyl (meth)acrylate. The oligomer content in the polymer dispersion is ≤1.4 weight-%, calculated from the dry polymer content.

19 Claims, No Drawings

POLYMER DISPERSION, ITS USE AND PROCESS FOR ITS PREPARATION

CROSS-REFERENCES

This application is national stage application of PCT/FI2020/050877 filed on Dec. 30, 2020 and claiming priority of Finnish national application 20196136 filed on Dec. 30, 2019, the contents of both of which are incorporated herein by reference.

FIELD OF INVENTION

The present invention relates to a polymer dispersion, its use and to a process for its preparation according to the preambles of the enclosed independent claims.

BACKGROUND

Due the global supply chains and growing online retail there is a growing consumption of packaging materials. Especially the board consumption for packaging purposes has increased, and the properties of the packaging board are a subject to a great interest. Among others, the board should protect the packaged goods from outside impacts, i.e. have good strength properties, as well as protect the packaged goods from moisture and grease, i.e. have good barrier properties. Furthermore, the board should be suitable also for packaging foodstuffs, which means that the board should be hygienic, and it should not contaminate the packaged food, e.g. by migration of chemical constituents from the board.

In paper and board manufacture sizing is used to reduce water absorption of paper or board and to make the paper or board more hydrophobic. Sizing can be performed as an internal sizing or as a surface sizing. Traditionally sizing of board has been performed as an internal sizing. However, there has been an increasing trend to use surface sizing in board production, especially for liner board, because of various economic factors and easier wet-end processes. This means that there is a need for more efficient surface sizing agents that are also suitable for surface sizing of board and that are safe in food contact applications.

An object of this invention is to minimise or even eliminate the disadvantages existing in the prior art.

SUMMARY OF THE INVENTION

An object of the present invention is to provide a polymer dispersion, which provides improved hydrophobation performance when used as a surface sizing agent or as a component in a surface sizing composition.

Another object of the invention is to provide a process for preparing a polymer dispersion, which can be used to improve the hydrophobation performance in surface sizing of paper or board.

Yet another object of the present invention is to provide a polymer dispersion that can be safely used for surface sizing of board intended for food packaging.

These objects are attained with the polymer dispersion and the method having the characteristics presented below in the characterising parts of the independent claims. Some preferable embodiments of the invention are described in the dependent claims.

The embodiments mentioned in this text relate, where applicable, to all aspects of the invention, even if this is not always separately mentioned.

A typical aqueous polymer dispersion according to the present invention comprises a styrene acrylate polymer, which is obtainable by free-radical polymerisation of

- 1-90 weight-% of monomer (a), which comprises at least one optionally substituted styrene, and
- 10-99 weight-% of monomer (b), which comprises at least one alkyl (meth)acrylate,
- 0-9 weight-% of monomer (c), which comprises at least one ethylenically unsaturated monomer, which is different from monomer (b), in a polymerisation medium comprising a cationic prepolymer, which prepolymer is obtainable by free radical polymerisation of at least

- 10-55 weight-% of a monomer (i), which comprises at least one ethylenically unsaturated quaternary and/or tertiary amine,
- 35-90 weight-% of a monomer (ii), which comprises at least one optionally substituted styrene,
- 0-55 weight-% of a monomer (iii), which comprises at least one alkyl (meth)acrylate;

and wherein the oligomer content in the polymer dispersion is 1.4 weight-%, calculated from the dry polymer content.

Typical use of an aqueous polymer dispersion according to the present invention is for surface sizing of paper, board or the like.

A typical process for preparation of an aqueous polymer dispersion according to the present invention comprises at least two polymerisation stages, wherein in a first polymerisation stage a free radical polymerisation of at least

- 10-55 weight-% of a monomer (i), which comprises at least one ethylenically unsaturated quaternary and/or tertiary amine,
- 35-90 weight-% of a monomer (ii), which comprises at least one optionally substituted styrene,
- 0-55 weight-% of a monomer (iii), which comprises at least one alkyl (meth)acrylate;

is performed for obtaining a polymerisation medium comprising a cationic prepolymer formed from the said monomers (i), (ii) and optional (iii);

in a second polymerisation stage a free radical polymerisation of

- 1-90 weight-% of monomer (a), which comprises at least one optionally substituted styrene, and
- 10-99 weight-% of monomer (b), which comprises at least one alkyl (meth)acrylate,
- 0-9 weight-% of monomer (c), which comprises at least one ethylenically unsaturated monomer, which is different from monomer (b), is performed in the said polymerisation medium for obtaining styrene acrylate polymer, wherein preferably the oligomer content in the polymer dispersion is ≤1.4 weight-%, calculated from the dry polymer content.

DETAILED DESCRIPTION OF THE INVENTION

Now it has been surprisingly found out that a polymer dispersion, which comprises a styrene acrylate polymer obtained by polymerisation in a polymerisation medium comprising a cationic prepolymer, and which has an oligomer content ≤1.4 weight-% calculated from the dry polymer content, shows unexpectedly good results in surface sizing of board, especially liner board. The low concentration of oligomers in the polymer dispersion is advantageous especially for polymer dispersions which are intended for use in surface sizing of paper, board or the like, particularly advantageous for use in surface sizing of board intended for food packaging. It was unexpectedly realised that the low oligomer content makes the polymer dispersion not only safe for food packaging applications, but may even improve the sizing results, for example strength and barrier properties that are obtained by sizing. Conventionally, the goal in many polymerisation processes have been to minimise the amount of free monomers in the end of the process. This has been achieved by subjecting the reaction mixtures to various post-polymerisation steps. However, these conventional steps may lead to formation of high or relatively high amounts of various oligomers, such as dimers, trimers, tetramers and pentamers. Now it has been surprisingly realised that the low oligomer content may be achieved by careful control and selection of the polymerisation conditions during the first polymerisation stage, where the pre-polymer is obtained by a free radical polymerisation of monomers (i), (ii) and optional (iii). At the same time the amount of free monomers can be maintained at low level, or practically non-existent level.

According to one preferable embodiment the oligomer content in the polymer dispersion may be in a range of 0-1.4 weight-%, preferably 0.001-1.2 weight-%, more preferably 0.001-0.7 weight-%, even more preferably 0.001-0.4 weight-%, calculated from the dry polymer content of the dispersion. The oligomer content in the polymer dispersion may be in a range of 0-1.0 weight-%, preferably 0.001-0.9 weight-% or 0.001-0.5 weight-%, calculated from the dry polymer content of the dispersion.

In the present context the term "oligomer" includes low molecular weight structures that have molecular weight ≤1000 g/mol. Thus, the term "oligomer" encompasses monomers as well as at least dimers, trimers, tetramers and pentamers formed from the used monomers. Especially the term "oligomer" encompasses structures formed from at least two monomers, such as dimers, trimers, tetramers and pentamers, and having a molecular weight of 100-1000 g/mol, preferably 150-1000 g/mol, more preferably 200-1000 g/mol.

According to one embodiment, the polymer dispersion may comprise oligomers, which have a molecular weight ≤1000 g/mol, in amount less than 1.4 weight-%, preferably less than 1.2 weight-% or less than 1.0 weight-%, more preferably less than 0.7 weight-% or less than 0.4 weight-%, calculated from the dry polymer content. Especially the polymer dispersion may comprise oligomers, which have a molecular weight <500 g/mol, in amount less than 0.5 weight-%, preferably less than 0.4 weight-% or 0.3 weight-%, more preferably less than 0.2 weight-%, calculated from the dry polymer content. The low amount of oligomers provides an unexpected improvement in surface sizing performance. It is assumed, without wishing to be bound by a theory, that the relative absence of oligomers reduces the migration of the polymer into the board structure. The polymer dispersion of the present invention is thus able to provide better coverage of the paper or board surface, which may be associated with the improved sizing results and/or barrier properties. At the same time the risk for oligomer migration into the packaged product is also reduced.

According to one embodiment of the invention the obtained polymer dispersion may have a weight average molecular weight MW in the range of 20 000-300 000 g/mol, preferably 25 000-200 000 g/mol, more preferably 30 000-100 000 g/mol, sometimes even 40 000-70 000 g/mol, analysed from the final dispersion. The weight average molecular weight may be determined, for example, by size exclusion chromatography.

According to one embodiment of the invention the polymer dispersion may have a number average molecular weight Mn≥000 g/mol, analysed from the final dispersion. The number average molecular weight Mn of the polymer dispersion may be, for example, in the range of 10 000-100 000 g/mol, preferably 11 000-50 000 g/mol, more preferably 12 000-40 000 g/mol, even more preferably 13 000-30 000 g/mol, analysed from the final dispersion.

According to one embodiment of the invention the obtained polymer dispersion may have a molecular weight dispersity index $D_M$≤4.5, preferably ≤4, more preferably ≤3.8. According to one embodiment the dispersity index may be in the range of 1.0-4.5, preferably 1.5-4, more preferably 1.5-3.8. In the present context the molecular weight dispersity index $D_M$ is calculated by dividing the weight average molecular weight MW with number average molecular weight Mn, i.e. by using the formula $D_M$=MW/Mn. It has been observed that the narrow molecular weight distribution, i.e. small molecular weight dispersity index $D_M$ value, provides a further advantageous effect on the hydrophobation performance, when the polymer dispersion is used as a surface sizing agent or as component in a surface sizing composition According to one embodiment the polymer dispersion may have a particle size D50 less than 70 nm, preferably less 60 nm, more preferably less than 40 nm, and/or a particle size D90 less than 120 nm, preferably less than 90 nm, more preferably less than 70 nm, even more preferably less than 50 nm. Particle size D50 and D90 values refer to the respective values for $50^{th}$ and $90^{th}$ percentile of a volume-based particle size distribution. The relatively small particle size and the narrow particle size distribution provide polymer dispersions with good viscosity properties and improve their function in surface sizing applications by providing good size distribution on the surface. For example, the hydrophobation and printing properties obtainable with the surface sizing may be improved. The particle size can be determined, for example, by laser correlation spectroscopy or by turbidity measurement.

The polymer dispersion according to present invention may have a solids content of 10-50 weight-%, preferably 20-45 weight-% more preferably 26-38 weight-%.

The polymerisation process of the polymer dispersion according to the present invention is a two-stage process. In the first polymerisation stage, the prepolymer is obtained by a free radical polymerisation of monomers (i), (ii) and optional (iii) in a polymerisation solvent. In the second polymerisation stage, the styrene acrylate polymer is obtained by free-radical polymerisation of monomers (a), (b) and optional (c) in a polymerisation medium comprising the cationic prepolymer.

In the present context the term "polymerisation medium" comprises the obtained prepolymer in the polymerisation solvent, the polymerisation solvent itself, optional water and any other possible but optional additive. Polymerisation medium does not comprise or include any monomers which are added to be polymerised in the second stage of the process to form the styrene acrylate polymer.

The cationic monomer (i) may comprise at least one ethylenically unsaturated quaternary amine or at least one ethylenically unsaturated tertiary amine or any of their mixtures. Monomer (i) may comprise, for example, a quaternary amine selected from a group consisting of quaternary salts of N,N,N-tri(C1-4-alkyl)amino C1-4-alkylacrylates, N,N,N-tri(C1-4-alkyl)amino C1-4-alkylmethacrylates, N,N, N-tri(C1-4-alkyl)amino C1-4-alkylacrylamides, N,N,N-tri (C1-4-alkyl)amino C1-4-alkylmethacrylamides and any mixtures thereof. The cationic monomer (i) may also be selected from 2-(dimethylamino)ethyl acrylate benzylchloride, 2-(dimethylamino)ethyl acrylate dimethylsulphate, 2-dimethylaminoethyl methacrylate dimethylsulphate, and diallyldimethylammonium chloride. Preferably, monomer (i) may be selected from quaternary salts of N,N,N-tri(C1-4-alkyl)amino C1-4-alkylacrylates, N,N,N-tri(C1-4-alkyl) amino C1-4-alkylmethacrylates and any mixtures thereof. More preferably, monomer (i) may be selected from quaternary salts of N,N,N-trimethylamino C1-4-alkylacrylates and N,N,N-trimethylamino C1-4-alkylmethacrylates with mineral acid, such as quaternary salts of N,N,N-trimethylamino ethyl(meth)acrylates with HCl. Even more preferably monomer (i) may be a quaternary amine monomer selected from [2-(methacryloyloxy)ethyl]trimethylammonium chloride and [2-(acryloyloxy)ethyl]-trimethylammonium chloride. Alternatively or in addition, monomer (i) may comprise, for example, a tertiary amine selected from a group consisting of N,N-di(C1-4-alkyl)amino C1-4-alkylacrylates, N,N-di(C1-4-alkyl)amino C1-4-alkylmethacrylates, N,N-di (C1-4-alkyl)amino C1-4-alkylacrylamides, N,N-di(C1-4-alkyl)amino C1-4-alkylmethacrylamides and any mixtures thereof, preferably N,N-di(C1-4-alkyl)amino C1-4-alkylacrylates, N,N-di(C1-4-alkyl)amino C1-4-alkylmethacrylates and any mixture thereof. Preferably monomer (i) may be a tertiary amine selected from N,N-dimethylamino C1-4-alkylacrylates and N,N-dimethylamino C1-4-alkylmethacrylates, such as N,N-dimethylaminoethyl(meth)acrylates. More preferably monomer (i) may comprise a tertiary amine selected from dimethylaminoethyl methacrylate, dimethylaminoethyl acrylate, dimethylaminopropyl methacrylate, dimethylaminopropyl acrylamide, and dimethylaminopropyl methacrylamide. Preferably monomer (i) may be a mixture of at least one ethylenically unsaturated quaternary amine(s) and/or at least one ethylenically unsaturated tertiary amine(s). Even more preferably monomer (i) may be a mixture of N,N-di(C1-4-alkyl)amino C1-4-alkylmethacrylates and N,N-di(C1-4-alkyl)amino C1-4-alkylmethacrylamides, such as 2-(dimethylamino)ethyl methacrylate and N-[3-(dimethylamino)propyl]methacrylamide.

The monomer (ii) may comprise at least one optionally substituted styrene. Substituted styrene may be selected from α-methylstyrene, vinyltoluene, ethylvinyltoluene, chloromethylstyrene, and any mixtures thereof.

The monomer (iii) may be selected from C1-C4-alkyl (meth)acrylates and any combinations thereof. Suitable C1-C4-alkyl (meth)acrylates are C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. Other suitable ethylenically unsaturated monomers (iii) may be selected from group comprising ethylhexyl acrylate; stearyl acrylate; stearyl methacrylate; esters of acrylic and methacrylic acid with alcohols which have more than four C atoms; acrylonitrile; methacrylonitrile; acrylamide; vinyl acetate; and anionic comonomers, such as acrylic acid, methacrylic acid, styrene sulphonic acid. C1-C4 alkyl (meth)acrylates may be preferred.

The cationic prepolymer may be obtained by free radical polymerisation of at least monomer (i); monomer (ii); and monomer (iii). Preferably the first stage polymerisation is free from anionic monomers, which means that the cationic prepolymer contains no structural units that originate from anionic monomer(s).

The cationic prepolymer may be obtained by free radical polymerisation of at least 10-55 weight-% of a monomer (i);

35-90 weight-% of a monomer (ii); and 0-55 weight-% of a monomer (iii). According to one embodiment of the invention the cationic prepolymer may be obtained by polymerisation of 15-55 weight-%, preferably 15-49 weight-%, more preferably 18-39 weight-%, of monomer (i); 51-85 weight-%, preferably 61-82 weight-%, of monomer (ii); and 0-20 weight-%, preferably 0-5 weight-%, of monomer (iii).

In the first polymerisation stage the polymerisation solvent may comprise, for example, at least one C1-C6 carboxylic acid, C1-C6 carboxylic anhydride or any of their mixtures. The polymerisation solvent may comprise saturated C1-C6-monocarboxylic acids and/or saturated C1-C6-dicarboxylic acids, saturated C1-C6-monocarboxylic acids are being preferred. The saturated C1-C6-carboxylic acids may optionally comprise one or more substituents, such as hydroxyl groups. The polymerisation solvent may comprise or be selected from formic acid, acetic acid, propionic acid, butyric acid, isobutyric acid, valeric acid, isovaleric acid, caproic acid, hydroxypropionic acid, hydroxybutyric acid, or any of their mixtures. Preferably the polymerisation solvent comprises formic acid, acetic acid, propionic acid, hydroxypropionic acid or any of their mixtures. Even more preferably polymerisation solvent comprises acetic acid. Alternatively, or in addition, the polymerisation solvent may comprise at least one C1-C6-carboxylic anhydride, which may be selected from formic anhydride, acetic anhydride, propionic anhydride, butyric anhydride or any mixtures thereof. The anhydrides may also comprise one or more substituents, such as hydroxyl groups. Preferably the polymerisation solvent comprises C1-C6-carboxylic anhydride, which is acetic anhydride. The polymerisation solvent may be added to the polymerisation reactor before the addition of the monomers and the initiator for the prepolymer polymerisation. Alternatively, a part of the polymerisation solvent may be fed to the polymerisation reactor together with the initiator.

According to one preferable embodiment the polymerisation solvent in the first polymerisation stage does not interfere with the polymerisation of the prepolymer. Especially, the polymerisation solvent does not provide any chain transfer effect, which usually reduces the polymer chain length and increases the amount of oligomers formed during polymerisation. The first polymerisation stage is preferably carried out free of alcohols. Especially, the first polymerisation stage is preferably carried out free of the presenece of isopropanol, which is known chain transfer agent in polymerisation of acrylate monomers.

According to one embodiment the polymerisation solvent in the first polymerisation stage comprises also water. The water in the polymerisation solvent typically originates from the used monomers, C1-C6 carboxylic acids and/or initiators. The water amount in the polymerisation solvent may be 0-25 weight-%, preferably 0-15 weight-%, calculated from the total solvent weight. If water is present in the polymerisation solvent, the polymerisation solvent preferably comprises at least one anhydride as described above to provide corresponding acid to the polymerisation solvent. The amount of C1-C6-carboxylic anhydride in the polymerisation solvent may preferably be higher or at least the same as the amount of water, given in moles. For example, the mole ratio of C1-C6-carboxylic anhydride and water in the polymerisation solvent may be from 0.9:1.1 to 1.1:0.9, preferably 1:1.

The free-radical polymerisation of the cationic prepolymer in the first polymerisation stage is carried out, initiated, by the presence of a first free radical initiator. Suitable first free radical initiators may be, for example, peroxides, such as hydrogen peroxide, alkyl hydroperoxide or dialkyl peroxide. The first free radical initiator may be selected, for example, from hydrogen peroxide, sodium peroxo-disulfate, potassium peroxodisulfate, ammonium peroxodisulfate, dibenzoyl peroxide, dilauroyl peroxide, di-tert-butyl peroxide, tert-butyl hydroperoxide, 1,1,3,3-tetramethylbutyl peroxy-2-ethylhexanoate, cumyl hydroperoxide or bis-cyclohexyl peroxydicarbonate. According to one preferable embodiment the first free radical initiator is dialkyl peroxide or alkyl hydroperoxide. Preferably the first free radical initiator is alkyl hydroperoxide or dialkyl peroxide, more preferably tert-butyl hydroperoxide. It is assumed that the use of peroxide as the first free radical initiator further reduces the formation of oligomers during the first polymerisation stage.

Peroxide initiator may usually be used as part of a redox initiator system comprising also a reducing agent. Suitable combinations for the redox initiator systems comprising a peroxide may comprise, for example, ascorbic acid, and heavy metal cations, such as iron, manganese, or cerium ions. According to one preferable embodiment redox initiator system comprises tert-butyl hydroperoxide and an iron salt. Initiation may be done in such a way that the metal salt of the redox initiator system, for example, an iron(II) salt, is added to the polymerisation solvent before the start of the first polymerisation stage, while a peroxide is added in simultaneously but separately with the addition of monomers. Iron(II) salt is usually used in concentrations of 5 to 300 mg/L Fe(II) ion, based on the total dispersion, higher or lower concentrations also being possible. The first polymerisation stage may be initiated also with a peroxide containing free radical initiator without a reducing agent.

According to one embodiment the free-radical polymerisation of the cationic prepolymer in the first polymerisation stage may be initiated by the presence of at least two first free radical initiators. The main first free radical initiator is selected from peroxide initiators as described above, and the auxiliary first free radical initiator may be selected from azoinitiators, such as 2,2'-azobis(2-methylpropionitrile), 2,2'-azobis(2-methylbutyronitrile), or dimethyl 2,2'-azobis (2-methyl propionate). The main first free radical initiator amounts at least 50 weight-% or at least 60 weight-% or even at least 75 weight-% from the total initiator amount. Preferably, the first polymerisation stage is free from azoinitiators, such as 2,2'-azobis(2-methylpropionitrile), 2,2'-azobis(2-methylbutyronitrile), or dimethyl 2,2'-azobis(2-methyl propionate).

The first polymerisation stage can be carried out either as a feed process or as a batch process. The polymerisation temperature in the first polymerisation stage may be in the range of 80-150° C. or 80-140° C., preferably 107-140° C., more preferably 110-140° C., even more preferably 115-130° C. The polymerisation temperature during the first polymerisation stage is preferably not too high, as that may lead to uncontrolled polymerisation reaction, which easily increases the formation of oligomers.

The first polymerisation stage is preferably carried out at normal atmospheric pressure of about 101 kPa or only slightly elevated pressure, for example in the range of 101-200 kPa or 101-150 kPa. The unpressurised first polymerisation stage seems to prevent the formation of oligomers in high amounts during the first polymerisation stage and thus further reduces the oligomer content in the final polymer dispersion.

The first polymerisation stage for the preparation of the aqueous prepolymer composition may be performed in the presence of one or more polymerisation regulators, such as chain transfer agents. The one or more polymerisation regulators, such as chain transfer agents, may be introduced to the reaction simultaneously, but separately, with the monomers. The polymerisation regulators may be introduced to the reaction also as mixture with the monomers. Suitable polymerisation regulators may be, for example, sulphur compounds, e.g. mercaptans, di- and polysulfides, esters and sulphides of thio- and dithiocarboxylic acids and enol sulphides. Examples of suitable mercaptans include ethyl mercaptan, n-butyl mercaptan, tert-butyl mercaptan, n-octadecyl mercaptan, n-dodecyl mercaptan, and tert-dodecyl mercaptan. Examples of other polymerisation regulators based on sulphur containing organic compounds include mercaptoethanol, mercaptopropanol, mercaptobutanol, thioglycolic acid, thioacetic acid, thiopropionic acid, 1-dodecanthiol, thioethanolamine, sodium dimethyldithiocarbamate, cysteine, ethyl thioglycolate, trimethylolpropane trithioglycolate, pentaerythrityl tetra(mercaptopropionate), pentaerythrityl tetrathioglycolate, trimethylolpropane tri(mercaptoacetate), butyl methylenebisthioglycolate, thioglycerol, glyceryl monothioglycolate, thiophenol, mercaptotrimethoxysilane, and acetylcysteine. Halogen compounds, aldehydes, ketones, formic acid, enol ethers, enamines, hydroxylamine, halogenated hydrocarbons, alcohols, ethylbenzene and xylene may also be used as polymerisation regulators, as well as terpenes, for example, monocyclic terpenes, such as terpinenes. When polymerisation regulators are used, the amount of the polymerisation regulator may be 0.01-5 weight-%, preferably 0.01-1.0 weight-%, more preferably 0.1-0.7 weight-%, calculated from the weight of the monomers. Sometimes the polymerisation medium may comprise 0-1 weight-%, preferably 0.05-1 weight-% of polymerisation regulator. Preferably the amount of polymerisation regulators, such as chain transfer agents, in the polymerisation medium is relatively low, or they are not used at all. In practice, the use of polymerisation regulator reduces the chain length of the prepolymer, and may lead to increased oligomer content, especially if used in high amounts. According to one preferable embodiment the first polymerisation stage is performed without any addition and/or use of a polymerisation regulator, such as chain transfer agents or the like.

The first polymerisation stage is usually completed by addition of water to provide the produced prepolymer as an aqueous prepolymer composition, either in a form of dispersion or solution. The concentration of the prepolymer prepared in the first polymerisation stage in the aqueous prepolymer composition, after completion of the polymerisation by water addition, may be 10-40 weight-% or 5-30 weight-%, preferably 13-24 weight-% or 8-19 weight-%. The aqueous prepolymer composition is then used as a polymerisation medium in the second polymerisation stage.

The cationic prepolymer prepared in the first polymerisation stage may have a weight average molecular weight, MW, in the range of 5000-200 000 g/mol, preferably 10 000-100 000 g/mol. The molecular weight may be determined, for example, by size exclusion chromatography.

In the second polymerisation stage, the polymer dispersion comprising a styrene acrylate polymer is obtained by free-radical polymerisation of monomers (a), (b) and optional (c). The monomers (a), (b) and optional (c) may be added to the polymerisation medium comprising the cationic prepolymer either individually or as a mixture. The free radical initiators suitable for initiating the polymerisation are added to the polymerisation medium comprising the cationic prepolymer.

Suitable monomers (a) may be styrene or substituted styrenes, such as $\alpha$-methylstyrene, vinyltoluene, ethylvinyltoluene, chloromethylstyrene, or any of their mixtures.

According to one preferable embodiment of the invention the monomer (b) in the second polymerisation stage may be selected from C1-C4 alkyl (meth)acrylates and any combinations thereof. Suitable C1-C4-alkyl (meth)acrylates are C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. The monomer (b) may also be a mixture of at least two isomeric butyl acrylates. For example, the monomer (b) may be a mixture of n-butyl acrylate and methyl methacrylate or a mixture of n-butyl acrylate and tert-butyl acrylate. For mixtures of two monomer (b) the mixing ratio may be 10:90 to 90:10.

The monomer (c) in the second polymerisation stage comprises at least one ethylenically unsaturated monomer, which is different from monomer (a) and monomer (b). Suitable other ethylenically unsaturated monomers (c) are ethylhexyl acrylate, stearyl acrylate, stearyl methacrylate, esters of acrylic and methacrylic acid with alcohols which have more than four C atoms, and further acrylonitrile, methacrylonitrile, acrylamide, vinyl acetate or anionic comonomers, such as acrylic acid, methacrylic acid, styrene sulphonic acid. Ethylhexyl acrylate and acrylonitrile may be preferred as monomer (c).

The styrene acrylate polymer may be obtained by free radical polymerisation of at least 1-90 weight-% of a monomer (a); 10-99 weight-% of a monomer (b); and 0-9 weight-% of a monomer (c), which is different from monomer (b), wherein the sum of monomers (a)+(b)+(c) is 100 weight-%. According to one embodiment of the invention the polymer may be obtained by polymerisation of 10-80 weight-%, preferably 15-75 weight-%, of monomer (a); 20-90 weight-%, preferably 25-85 weight-%, of monomer (b); and 0-7 weight-%, preferably 0-5 weight-%, of monomer (c); wherein the sum of monomers (a)+(b)+(c) is 100 weight-%.

Monomers may be preferably selected so that the glass transition temperature of the polymer dispersion is in a range from +5 to +85° C., preferably from +30 to +70° C., more preferably from +42 to +68° C.

In the second polymerisation stage a water-soluble redox system comprising an oxidant and a reducing agent may be used for initiating the polymerisation of styrene acrylate polymer. The oxidant of the redox system may be selected from peroxides, such as hydrogen peroxide, sodium peroxodisulphate, potassium peroxodisulphate, ammonium peroxodisulphate, dibenzoyl peroxide, dilauroyl peroxide, di-tert-butyl peroxide, tert-butyl hydroperoxide, 1,1,3,3-tetramethylbutyl peroxy-2-ethylhexanoate, cumyl hydroperoxide or bis-cyclohexyl peroxydicarbonate. The reducing agent of the redox system may be selected from sodium sulphite, sodium pyrosulphite, sodium bisulphite, sodium dithionite, sodium hydroxymethanesulphinate or ascorbic acid, or metal salt such as cerium, manganese or iron(II) salt. According to one preferable embodiment the second polymerisation stage is usually carried out by using a redox initiator system comprising hydrogen peroxide and a metal salt. The metal salt, such as iron(II) salt may be added to the polymerisation medium before the start of the polymerisation, while hydrogen peroxide is added in simultaneously but separately with the addition of monomers. Iron(II) salt may be used in concentrations of 5-300 mg/L Fe(II) ion, based on the total dispersion, higher or lower concentrations also being possible. Hydrogen peroxide (calculated as 100%) may be added in concentration of 0.2-2.0 weight-%, based on weight of monomers. Polymerisation with the redox system comprising hydrogen peroxide and metal ions provides fine-particle sized dispersions having a good sizing effect.

The second polymerisation stage can be carried out either by a feed process or by a batch process. The polymerisation temperature at the second polymerisation stage may be in a range of 40-105° C., preferably 50-100° C.

A polymerisation regulator may be used in the second polymerisation stage. The polymerisation regulator may be chosen from same groups of compounds as in the first polymerisation stage, described in detail above. The amount of the polymerisation regulator in the second polymerisation stage may be similar as in the first polymerisation stage. According to one embodiment the second polymerisation stage is free from polymerisation regulators, i.e. no polymerisation regulator is added or used in the second polymerisation stage.

According to one embodiment the polymerisation of styrene acrylate polymer in the second polymerisation stage is brought into a completion by an addition of a second initiator. The completion of the second polymerisation stage may be ensured for example by addition of the second initiator. Suitable free radical initiators used as second initiator are, for example, organic peroxides, such as dibenzoyl peroxide, di-tert-butyl peroxide, tert-butyl hydroperoxide, cumyl hydroperoxide dilauroyl peroxide, 1,1,3,3-tetramethylbutyl peroxy-2-ethylhexanoate or bis-cyclohexyl peroxydicarbonate. According to one preferable embodiment the second free radical initiator is dialkylperoxide or alkyl hydroperoxide, more preferably tert-butyl hydroperoxide or di-tert-butyl hydroperoxide. The second free radical initiator is preferably added after the addition of the monomers (a), (b) and optional (c) and after the polymerisation with the water-soluble redox system in the second polymerisation stage for subsequent activation of possible residual monomers, and for completion of the polymerisation. In this case, the second polymerisation stage is first carried out, for example, with redox initiator system comprising e.g. hydrogen peroxide and iron(II) sulphate, as described above. The second free radical initiator, e.g. organic peroxide, is then added for subsequent activation. The initiator may be added directly after the monomer feeds or after a mixing time. It is possible to achieve a polymer conversion of >99% preferably >99.5%, even more preferably >99.9% and a residual monomer content <1000 ppm of the dispersion and to dispense with monomer removal. Preferably the residual monomer content is <500 ppm, preferably <300 ppm, even more preferably <100 ppm, of the dispersion. The residual monomer content comprises all monomers in the final polymer dispersion, i.e. encompassing monomers both from the first and the second polymerisatio stage. The residual monomer content can be analysed with chromatographic methods e.g. HPLC.

The first and the second polymerisation stages are usually carried out in the absence of oxygen, preferably in an inert gas atmosphere, for example under nitrogen atmosphere. During the both polymerisation stages a thorough mixing with the aid of any suitable stirrer is preferably be ensured.

In the first and/or second polymerisation stage emulsifiers are used only if needed. Examples of the possible emulsifiers are sodium alkanesulfonates, sodium alkylsulphates, sulphosuccinic esters, quaternary alkyl ammonium salts. Preferably the first and/or second polymerisation stage is free from any emulsifiers.

The obtained polymer dispersion preferably has a solids content in the range of 10-50 weight-%, preferably 25-40 weight-% or 26-38 weight-%. The polymer dispersion may have a viscosity <200 mPas, preferably in the range of 0.1-100 mPas, more preferably 1-50 mPas, measured at 25° C. with Brookfield LVDV viscometer, spindle 18, measured at 60 rpm when the viscosity is ≤50 mPas, or measured at 30 rpm when the viscosity is >50-200 mPas. The polymer dispersion may have a pH value in the range of 2-5, preferably 2.5-4.5.

The amount of the cationic prepolymer may typically be in a range of 20-60 weight-%, preferably 30-50 weight-%, calculated from dry solids of the total polymer dispersion.

The polymer dispersion according to the present invention is especially suitable for use as a sizing agent or a component in surface sizing compositions. The surface sizing compositions may further comprise other additives conventionally used in surface sizing of paper, board and other cellulosic products. Such additives commonly known in the art include, but are not limited to, dispersing agents, anti-foaming agents, colorants, inorganic pigments and fillers, anti-curl agents, anti-static agents, additional conventional components such as surfactants, plasticizers, humectants, defoamers, UV absorbers, light fastness enhancers, polymeric dispersants, dye mordants, optical brighteners, levelling agents, rheology modifiers, and strength additives. The additives may be used to further enhance the sizing performance, and improve runnability of a size press, and otherwise adjust the surface properties of the final paper, board or the like.

The surface sizing composition may further comprise starch and/or starch derivative, such as dextrin. The starch may be modified starch, for example, degraded, oxidized or cationized starch. Typically, the aqueous polymer dispersion of the present invention may be applied on the paper or board surface mixed with a solution of starch and/or starch derivative. The starch and/or starch derivative concentration in the sizing composition may be in the range of 1-30 weight-%, preferably 5-25 weigh-%, more preferably 8-20 weight-%, and the concentration of polymer dispersion (as dry) may be 0.1-20 weight-%, preferably 0.5-5.0 weight-%, based on the weight of dry starch.

Temperature of the surface sizing composition may be in the range of 50-85° C. at the sizing.

The surface sizing composition comprising polymer dispersion according to the present invention is suitable for surface sizing of cellulosic products, in particular all paper and paper board qualities, which may be unsized or may be presized in the paper pulp, for example with alkylketene dimer, alkenylsuccinic anhydride or rosin. The specific techniques used to size paper and other cellulosic products such as board, include, but are not limited to, those techniques that are commonly employed in papermaking to apply the sizing composition to the cellulose-based product. The surface sizing composition may be provided as a liquid or a foam onto the cellulose-based product. For instance, the aqueous sizing composition may be applied to the surface of the paper using a puddle or film size press or a size press by using a roll or a doctor knife blade. Alternatively, the sizing composition may be sprayed onto the paper web or be applied by dipping the paper into the aqueous surface sizing composition. Paper or other cellulosic product treated with the surface sizing solution is then dried at elevated temperatures, typically temperature of the paper is from 80 to 110° C.

Surface sizing composition comprising polymer dispersion according to the present invention is particularly suitable for surface sizing of cellulosic products when the cellulosic product comprises recycled fibres.

EXPERIMENTAL

The following methods have been used in the example to characterise polymer dispersions.

Particle Size

The particle size measurements were done by using Malvern Zetasizer Nano-device.

Solids Content

The solids content was measured using a Mettler Toledo Halogen moisture analyser.

Viscosity

The viscosities were measured at 25° C., with Brookfield LVDV viscometer, in a small sample adapter with spindle 18, 60 rpm.

Number Average Molecular Weight ($M_n$), Weight Average Molecular Weight ($M_w$), Dispersity Index ($D_M$) and Oligomer Content The molecular weight was determined by size-exclusion chromatography (SEC) using an Agilent 1100 HPLC system equipped with integrated autosampler, degasser, column oven and refractive index detector. Eluent was N,N-dimethylformamide (DMF) with 5 g/l lithium chloride. Flow rate was 0.6 ml/min at 45° C. (column oven and RI detector). Column set consisted of three Polymer Standard Service GRAM columns (1000 Å+2×30 Å columns). Samples were freeze-dried prior to the analysis. Injection volume was 50 μl with a sample concentration of 4 mg/ml. For conventional column calibration, narrow molecular weight distribution poly(styrene) standards (Polymer Standards Service) were used to calibrate the system over Mw range 266-1210000 g/mol. Calibration curve was created using a GPC Addon software by Agilent.

Oligomer content was defined as the % of signal intensity area in the <1000 g/mol range compared to the total polymer signal area.

Testing

Sizing performance of the surface size dispersions were tested on an internally unsized linerboard. The surface size was added to 12% surface size starch (C*film 07312) solution. The temperature of surface size mixture was set at 65° C. The sheets were run through Mathis horizontal pond size press type 5607 at 2 m/min (2 Bar). Temperature of the size press nip was set to 65° C. Sheets were dried at 95° C. using either a PTI laboratory sheet dryer for 1 minute per side or using an AMC drum dryer at speed 50, giving drying time of 1.5 minutes. Sizing efficiency was determined by measuring Cobb60 sizing degree according to standard ISO 535.

EXAMPLES

Polymerisation Example 1

73.2 g of glacial acetic acid was weighed into a 1 l glass reactor with a cooling/heating jacket. The reactor was heated to 118° C. Nitrogen atmosphere was kept in the reactor and stirring was continued throughout the reaction. After the reactor had reached the temperature, chemical feeds into the reactor were started. A monomer feed of 76.2 g styrene, 4.1 g 3-dimethylamino propyl methacrylamide, 20.5 g 2-(dimethylamino)ethyl methacrylate and 0.50 g dodecyl mercaptan was fed in 90 minutes. A second feed of 11.9 g glacial acetic acid and 3.96 g tert-butyl hydroperoxide (70%) was fed simultaneously during the monomer feeds and continued for 3 minutes after the monomer feed ended.

Temperature in the reactor was kept at 118° C. during the feeds and for 90 minutes after the feeds ended and then cooling to 76° C. was started. Then 437 g of heated demineralized water was added into the reactor and a 94.1 g sample of the prepolymer was taken out. After the temperature had stabilized to 76° C., 7.30 g of 2.9% strength aqueous solution of ammonium iron sulphate hexahydrate was added into the reactor. After 15 minutes, the initiator feed of 41.9 g of 3.2% solution of hydrogen peroxide was started. After 5 minutes, a monomer mixture of 6.3 g of n-butyl acrylate, 57.7 g of tert-butyl acrylate, 0.70 g of dodecyl mercaptan and 64.0 g of styrene was started. The monomer mixture was fed in 230 minutes. The initiator feed was continued for 25 minutes after the monomer feed ended. Temperature was kept at 76° C. during the feeds and 45 minutes after the feeds ended. Thereafter, cooling was affected to room temperature. Filtration was performed using a 100 μm filter cloth. A finely divided polymer dispersion was obtained. The polymer dispersion had solids content of 30.2 weight-%, pH 3.2 and viscosity of 20 mPas. Further properties are given in Table 1.

Polymerisation Example 2

73.2 g of glacial acetic acid was weighed in to a 1 L glass reactor with a cooling/heating jacket. The reactor was heated to 118° C. Nitrogen atmosphere was kept in the reactor and stirring was continued throughout the reaction. After the reactor had reached the temperature, chemical feeds into the reactor were started. A monomer feed of 76.2 g styrene, 4.1 g of 3-dimethylaminopropyl methacrylamide, 20.5 g of 2-(dimethylamino)ethyl methacrylate and 0.50 g dodecyl mercaptan was fed in 90 minutes. A second feed of 11.9 g of glacial acetic acid and 3.96 g of tert-butyl hydroperoxide (70%) was fed simultaneously during the monomer feeds and continued for 3 minutes after the monomer feed ended.

Temperature in the reactor was kept at 118° C. during the feeds and for 90 minutes after the feeds ended and then cooling to 76° C. was started. Then 437 g of heated demineralized water was added into the reactor and a 94.1 g sample of the prepolymer was taken out. After the temperature had stabilized to 76° C., 7.30 g of 2.9% strength aqueous solution of ammonium iron sulphate hexahydrate was added in to the reactor. After 15 minutes, the initiator feed of 41.9 g of 3.2% solution of hydrogen peroxide was started. After 5 minutes, a monomer mixture of 6.3 g of n-butyl acrylate, 57.7 g of tert-butyl acrylate, 0.70 g of dodecyl mercaptan and 64.0 g of styrene was started. The monomer mixture was fed in 285 minutes simultaneously with the initiator feed. Temperature was kept at 76° C. during the feeds and 45 minutes after the feeds ended. Thereafter, cooling was affected to room temperature. Filtration was performed using a 100 μm filter cloth. A finely divided polymer dispersion was obtained. The polymer dispersion had solids content of 30.2 weight-%, pH 3.3 and viscosity of 27 mPas. Further properties are given in Table 1.

Polymerisation Example 3

73.2 g of glacial acetic acid was weighed in to a 1 L glass reactor with a cooling/heating jacket. The reactor was heated to 118° C. Nitrogen atmosphere was kept in the reactor and stirring was continued throughout the reaction. After the reactor had reached the temperature, chemical feeds into the reactor were started. A monomer feed of 76.2 g styrene, 4.1 g of 3-dimethylaminopropyl methacrylamide, 20.5 g of 2-(dimethylamino)ethyl methacrylate and 0.50 g dodecyl mercaptan was fed in 90 minutes. A second feed of 11.9 g of glacial acetic acid and 3.96 g of tert-butyl hydroperoxide (70%) was fed simultaneously during the monomer feeds and continued for 3 minutes after the monomer feed ended.

Temperature in the reactor was kept at 118° C. during the feeds and for 90 minutes after the feeds ended and then cooling to 76° C. was started. Then 437 g of heated demineralized water was added into the reactor and a 94.1 g sample of the prepolymer was taken out. After the temperature had stabilized to 76° C., 7.30 g of 2.9% strength aqueous solution of ammonium iron sulphate hexahydrate was added in to the reactor. After 15 minutes, the initiator feed of 41.9 g of 3.2% solution of hydrogen peroxide was started. After 5 minutes a monomer mixture of 6.3 g of n-butyl acrylate, 57.7 g of tert-butyl acrylate, 0.70 g of dodecyl mercaptan and 64.0 g of styrene was started. The monomer mixture was fed in 200 minutes. The initiator feed was continued for 25 minutes after the monomer feed ended. Temperature was kept at 76° C. during the feeds and 90 minutes after the feeds ended. Thereafter, cooling was affected to room temperature. Filtration was performed using a 100 μm filter cloth. A finely divided polymer dispersion was obtained. The polymer dispersion had solids content of 30.8 weight-%, pH 3.3, and viscosity 20 mPas. Further properties are given in Table 1.

TABLE 1

| Properties of the polymer dispersions. | | | | | |
|---|---|---|---|---|---|
| | Mw [g/ mol] | Mn [g/ mol] | Oligomer content w-%* | | Dv(90) [nm] | Dv(50) [nm] |
| | | | <500 Da | <1000 Da | | |
| Example 1 | 56 100 | 15 100 | 0.26 | 0.72 | 42 | 22 |
| Example 2 | 52 400 | 16 350 | 0.16 | 0.49 | 39 | 22 |
| Example 3 | 51 500 | 15 450 | 0.22 | 0.48 | 45 | 26 |

*of the polymer content

Application Example 1

Sizing performance of the surface size polymer dispersions were tested on an internally unsized linerboard. Each surface size polymer dispersion was added to 12% surface size starch (C*film 07312) solution. The temperature of the obtained surface size mixture comprising the polymer dispersion and starch was set at 65° C. The sheets were run through Mathis horizontal pond size press type 5607 at 2 m/min (2 Bar). Temperature of the size press nip was set to 65° C. Sheets were dried at 95° C. using either a PTI laboratory sheet dryer for 1 minute per side or using an AMC drum dryer at speed 50, giving drying time of 1.5 minutes.

Sizing efficiency was determined by measuring Cobb60 sizing degree according to standard ISO 535.

Three polymer dispersions were tested: Polymer dispersion 1 according to polymerisation example 1, polymer dispersion 2 according to polymerisation example 2 and polymer dispersion 3 according to polymerisation example 3.

The results are shown in Table 2.

TABLE 2

Surface size results.

| Dose of surface | Cobb60 [g/m$^2$] | | |
|---|---|---|---|
| size dispersion* | 0.12 | 0.24 | 0.36 |
| Example 1 | 70 | 28 | 24 |
| Example 2 | 64 | 34 | 25 |
| Example 3 | 59 | 30 | 23 |

*given as dry solids, weigh-% of the surface size composition

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. An aqueous polymer dispersion comprising a styrene acrylate polymer obtained by free-radical polymerisation of
    1-90 weight-% of a monomer (a) comprising at least one optionally substituted styrene,
    10-99 weight-% of a monomer (b) comprising at least one alkyl (meth)acrylate, and
    0-9 weight-% of a monomer (c) comprising at least one ethylenically unsaturated monomer, which is different from the monomer (b),
in a polymerisation medium comprising a cationic prepolymer obtained by free radical polymerization, initiated by a presence of a first radical initiator comprising a peroxide, of at least
    10-55 weight-% of a monomer (i) comprising at least one ethylenically unsaturated quaternary and/or tertiary amine,
    35-90 weight-% of a monomer (ii) comprising at least one optionally substituted styrene, and
    0-55 weight-% of a monomer (iii) comprising at least one alkyl (meth)acrylate;
in a first polymerization stage with a polymerization solvent comprising at least one C1-C6 carboxylic acid anhydride, wherein a mole ratio of C1-C6 carboxylic acid anhydride to water in the polymerization medium is from 0.9:1.1 to 1.1:0.9, wherein oligomer content in the polymer dispersion is ≤1.4 weight-%, calculated from dry polymer content.

2. The aqueous polymer dispersion according to claim 1, wherein the oligomer content in the polymer dispersion is in a range of 0.001-1.2 weight-%, calculated from the dry polymer content of the dispersion.

3. The aqueous polymer dispersion according to claim 1 wherein the polymer dispersion comprises oligomers, which have a molecular weight <1000 g/mol, in amount less than 1.4 weight-%, calculated from the dry polymer content, and/or the polymer dispersion further comprises oligomers, which have a molecular weight <500 g/mol, in amount less than 0.5 weight-%, calculated from the dry polymer content.

4. The aqueous polymer dispersion according to claim 1, wherein the polymer dispersion has a weight average molecular weight MW in the range of 20 000-300 000 g/mol.

5. The aqueous polymer dispersion according to claim 1, wherein the polymer dispersion has a number average molecular weight in the range of 10 000-100 000 g/mol.

6. The aqueous polymer dispersion according to claim 1, wherein the polymer dispersion has a particle size D50 less than 70 nm and/or a particle size D90 less than 120 nm.

7. The aqueous polymer dispersion according to claim 1, wherein the styrene acrylate polymer is obtained by free-radical polymerisation of at least
    10-80 weight-% of the monomer (a);
    20-90 weight-% of the monomer (b); and
    0-7 weight-% of the monomer (c), which is different from the monomer (b), and
wherein the sum of monomers (a)+(b)+(c) is 100 weight-%.

8. The aqueous polymer dispersion according to claim 1, wherein the monomer (b) is selected from C1-C4 alkyl methacrylates and any combinations thereof.

9. The aqueous polymer dispersion according to claim 1, wherein the monomer (c) is selected from ethylhexyl acrylate, stearyl acrylate, stearyl methacrylate, esters of acrylic and methacrylic acid with alcohols which have more than four C atoms, acrylonitrile, methacrylonitrile, acrylamide, vinyl acetate and anionic comonomers.

10. The aqueous polymer dispersion according to claim 1, wherein the cationic prepolymer is obtained by free radical polymerisation of at least
    15-49 weight-% of the monomer (i);
    51-85 weight-% of the monomer (ii); and
    0-20 weight-% of the monomer (iii).

11. The aqueous polymer dispersion according to claim 1, wherein the monomer (i) is a quaternary amine selected from the group consisting of quaternary salts of N,N,N-tri(C1-4-alkyl)amino C1-4-alkylacrylates, N,N,N-tri(C1-4-alkyl)amino C1-4-alkylmethacrylates, N,N,N-tri(C1-4-alkyl) amino C1-4-alkylacrylamides, N,N,N-tri(C1-4-alkyl)amino C1-4-alkylmethacrylamides and any mixtures thereof; and/or the monomer (i) is a tertiary amine selected from a group consisting of N,N-di(C1-4-alkyl)amino C1-4-alkylacrylates, N,N-di(C1-4-alkyl)amino C1-4-alkylmethacrylates, N,N-di(C1-4-alkyl)amino C1-4-alkylacrylamides, N,N-di(C1-4-alkyl)amino C1-4-alkylmethacrylamides, and any mixtures thereof.

12. The aqueous polymer dispersion according to claim 1, wherein the monomer (iii) is selected from the group consisting of n-butyl (meth)acrylate; iso-butyl (meth)acrylate; tert-butyl (meth)acrylate; 2-butyl (meth)acrylate; methyl (meth)acrylate; ethyl (meth)acrylate, and propyl (meth)acrylate.

13. The aqueous polymer dispersion according to claim 1, wherein the monomer (ii) or the monomer (a) is selected from styrene, α-methylstyrene, vinyltoluene, ethylvinyltoluene, chloromethylstyrene, and any mixtures thereof.

14. A method to surface size paper, board or the like, the method comprising a step of adding an aqueous polymer dispersion according to claim 1.

15. A process for preparation of an aqueous polymer dispersion according to claim 1 comprising at least two polymerisation stages, wherein
    in a first polymerisation stage initiated by a presence of a first radical initiator comprising a peroxide, a free radical polymerisation of at least
        10-55 weight-% of the monomer (i), which comprises at least one ethylenically unsaturated quaternary and/or tertiary amine, 35-90 weight-% of the monomer (ii), which comprises at least one optionally substituted styrene, 0-55 weight-% of the monomer (iii), which comprises at least one alkyl (meth)acrylate;

is performed for obtaining a polymerisation medium comprising a cationic prepolymer formed from the monomers (i), (ii) and optional (iii); and in a second polymerisation stage a free radical polymerisation of 1-90 weight-% of the monomer (a) comprising at least one optionally substituted styrene, and 10-99 weight-% of the monomer (b) comprising at least one alkyl (meth)acrylate, 0-9 weight-% of the monomer (c) comprising at least one ethylenically unsaturated monomer, which is different from the monomer (b), is performed in the polymerisation medium for obtaining styrene acrylate polymer;

wherein a polymerisation solvent in the first polymerisation stage comprises at least one C1-C6 carboxylic anhydride, and wherein a mole ratio of C1-C6 carboxylic acid anhydride to water in the polymerization medium is from 0.9:1.1 to 1.1:0.9.

16. The process according to claim 15, wherein the polymerisation temperature in the first polymerisation stage is in the range of 80-150° C.

17. The process according to claim 15, wherein the polymerisation temperature in the second polymerisation stage is in a range of 40-105° C.

18. The process according to claim 15, wherein the polymerisation of styrene acrylate polymer in the second polymerisation stage is initiated by a water-soluble redox system comprising an oxidant and a reducing agent, and the polymerisation of styrene acrylate polymer in the second polymerisation stage is brought into a completion by an addition of a second initiator.

19. The process according to claim 15, wherein the first free radical initiator is selected from hydrogen peroxide, alkyl hydroperoxide and dialkyl peroxide.

* * * * *